US012659833B2

(12) United States Patent
Papageorgiou et al.

(10) Patent No.: US 12,659,833 B2
(45) Date of Patent: Jun. 16, 2026

(54) METHOD, APPARATUS, AND NON-TRANSITORY COMPUTER-READABLE MEDIUM FOR INDICATING EDGE COMPUTING USAGE FOR TRAFFIC OF A SESSION TO A USER EQUIPMENT

(71) Applicant: Nokia Technologies Oy, Espoo (FI)

(72) Inventors: Apostolos Papageorgiou, Munich (DE); Shubhranshu Singh, Seeheim-Jugenheim (DE)

(73) Assignee: Nokia Technologies Oy, Espoo (FI)

( * ) Notice: Subject to any disclaimer, the term of this patent is extended or adjusted under 35 U.S.C. 154(b) by 509 days.

(21) Appl. No.: 18/302,050

(22) Filed: Apr. 18, 2023

(65) Prior Publication Data

US 2024/0357468 A1     Oct. 24, 2024

(51) Int. Cl.
*H04W 40/22*          (2009.01)
*H04W 8/22*           (2009.01)
*H04W 28/08*          (2023.01)

(52) U.S. Cl.
CPC ............. *H04W 40/22* (2013.01); *H04W 8/22* (2013.01); *H04W 28/0925* (2020.05)

(58) Field of Classification Search
CPC .... H04W 40/22; H04W 28/0925; H04W 8/22
See application file for complete search history.

(56) References Cited

U.S. PATENT DOCUMENTS

| | | | | |
|---|---|---|---|---|
| 12,389,296 | B2 * | 8/2025 | Ryu | H04W 76/12 |
| 2022/0264370 | A1 * | 8/2022 | Qiao | H04W 60/00 |
| 2023/0063570 | A1 * | 3/2023 | Gundavelli | H04W 4/50 |
| 2023/0079126 | A1 * | 3/2023 | Mas Rosique | H04L 61/4511 |
| | | | | 709/245 |
| 2023/0093193 | A1 * | 3/2023 | Mathison | H04W 76/10 |
| | | | | 709/227 |
| 2024/0073178 | A1 * | 2/2024 | Mas Rosique | H04L 41/12 |
| 2024/0349364 | A1 * | 10/2024 | Qiao | H04W 76/10 |
| 2025/0113395 | A1 * | 4/2025 | Starsinic | H04W 28/0925 |

OTHER PUBLICATIONS

"3rd Generation Partnership Project; Technical Specification Group Services and System Aspects; System architecture for the 5G System (5GS); Stage 2 (Release 17)", 3GPP TS 23.501, V17.4.0, Mar. 2022, pp. 1-567.
"3rd Generation Partnership Project; Technical Specification Group Services and System Aspects; Procedures for the 5G System (5GS); Stage 2 (Release 17)", 3GPP TS 23.502, V17.4.0, Mar. 2022, pp. 1-738.

(Continued)

*Primary Examiner* — Congvan Tran
(74) *Attorney, Agent, or Firm* — Nokia Technologies Oy

(57)          ABSTRACT

An apparatus is provided, which comprises at least one processor and at least one memory including computer program code, the at least one memory and the computer program code configured to, with the at least one processor, cause the apparatus at least to perform: determining edge computing related information concerning edge computing for a session of a user equipment, incorporating the edge computing related information in route selection policy information, and providing the route selection policy information to the user equipment when it is determined that currently edge computing is applied to the session.

7 Claims, 6 Drawing Sheets

(56) References Cited

OTHER PUBLICATIONS

"3rd Generation Partnership Project; Technical Specification Group Services and System Aspects; Policy and charging control framework for the 5G System (5GS); Stage 2 (Release 17)", 3GPP TS 23.503, V17.4.0, Mar. 2022, pp. 1-146.

"3rd Generation Partnership Project; Technical Specification Group Services and System Aspects; 5G System Enhancements for Edge Computing; Stage 2 (Release 17)", 3GPP TS 23.548, V17.2.0, Mar. 2022, pp. 1-55.

"3rd Generation Partnership Project; Technical Specification Group Services and System Aspects; 5G System Enhancements for Edge Computing; Phase 2 (Release 18)", 3GPP TR 23.700-48, V0.2.0, Apr. 2022, pp. 1-82.

"Solution to KI#6: Controlling non-3GPP access of EC traffic via URSP and Atsss", 3GPP TSG-WG SA2 Meeting #150E e-meeting, S2-2202092, Agenda: 9.11, Ericsson, Apr. 6-12, 2022, pp. 1-4.

"Solution to KI#6: SMF indication of EC-related functionality", 3GPP TSG-WG SA2 Meeting #150E e-meeting, S2-2202096, Agenda: 9.11, Ericsson, Apr. 6-12, 2022, pp. 1-3.

"KI#6: New Solution—Avoiding Switch Away Based on an Indication in the URSP", SA WG2 Meeting #150e, S2-2202250, Agenda: 9.11, InterDigital Inc, Apr. 6-12, 2022, pp. 1-2.

* cited by examiner

METHOD, APPARATUS, AND NON-TRANSITORY COMPUTER-READABLE MEDIUM FOR INDICATING EDGE COMPUTING USAGE FOR TRAFFIC OF A SESSION TO A USER EQUIPMENT

FIELD

The present disclosure relates to an apparatus, a method and a computer readable-medium for indicating edge computing usage for traffic of a session to a user equipment.

RELATED BACKGROUND ART

The following meanings for the abbreviations used in this specification apply:

AF Application Function
AMF Access and Mobility Management Function
BP Branching Point
C-PSA Central PDU Session Anchor
DN Data Network
DNAI Data Network Application Identifier
DNN Data Network Name
EAS Edge Application Server
EASDF Edge Application Server Discovery Function
EC Edge Computing
L-PSA Local PDU Session Anchor
NAS Non Access Stratum
NEF Network Exposure Function
NRF Network Repository Function
PCF Policy Control Function
PDU Protocol Data Unit
QoS Quality of Service
RSD Route Selection Descriptor
RSN Redundancy Sequence Number
S-NSSAISingle Network Slice Selection Assistance Information
SMF Session Management Function
SSC Session and Service Continuity
UDM Unified Data Management
UE User Equipment
UL Uplink
UL CL Uplink Classifier
UPF User Plane Function
URSP UE Route Selection Policy Example embodiments, although not limited to this, relate to edge computing.

5G specifications (cf. 3gpp TS 23.501, TS 23.502, TS 23.548) describe the possibility of a core network of a wireless communication network using Edge Computing (EC) for certain traffic of a PDU session, i.e., for directing and/or offloading certain traffic of a PDU session received from a UE to a local Data Network (DN), which contains one or more Edge Application Servers (EAS) of application with which the UE is communicating with via a user plane function of the core network. The use of edge computing by a core network (i.e., the directing and/or offloading certain traffic of a PDU session to local DN can enhance QoS metrics of the PDU session such as latency because the local DN is located closer to the core network.

A network function of a core network (e.g., a SMF of a 5G core network (5GC)) may determine and select a local User Plane Function (UPF) to direct and/or offload certain traffic of a PDU session to a local DN when the core network (e.g., the SMF of the 5GC) determines that edge computing shall be used for certain traffic of a PDU session. The 5GC includes an Uplink Classifier (UL CL, i.e., a UPF "in the middle" between a local UPF and a central UPF which directs certain traffic of a PDU session either towards the central UPF or towards the local UPF) or with direct usage of only a local UPF. FIG. 4, which reproduces FIGS. 4.2-1 of TS 23.458, shows a UL CL in a non-roaming scenario as an example, where a L-PSA (Local PDU Session Anchor) (i.e., a local UPF) directs UL traffic of a PDU session towards a local DN which contains an EAS that so that the EAS can perform edge computing on the UL traffic of the PDU session.

The use of the L-PSA is determined by the SMF, based on various criteria, which includes the UE location. The SMF is either locally configured or provisioned (e.g., via requests that follow the AF→NEF→PCF→SMF path) with routing requirements (i.e., rules about which traffic of a PDU session is to be directed and/or offloaded to a local data network via a L-PSA, when, and where to direct and/or offload certain traffic of traffic flows of a PDU session. The traffic flows of a PDU session are characterized by traffic filters such as source and destination addresses, target DNN (Data Network Name), S-NSSAI (i.e., target network slice) etc.

However, according to the prior art, a UE has no way of knowing when edge computing is being used for certain traffic of a PDU session sent to and/or received from a wireless communication network.

SUMMARY

Example embodiments provide the UE with information about the use of edge computing for certain traffic of a PDU session of a UE (i.e., the directing and offloading of certain traffic of a PDU session by a 5GC to a local data network containing one or more EAS's via a L-PSA).

According to a first aspect, an apparatus of a network control element is provided, wherein the apparatus comprises: at least one processor and at least one memory storing instructions which, when executed by the at least one processor, cause the apparatus at least to perform: determining edge computing related information concerning edge computing for a session of a user equipment, incorporating the edge computing related information in route selection policy information, and providing the route selection policy information to the user equipment when it is determined that currently edge computing is applied to the session.

According to a second aspect, a method for use in a network control element is provided, wherein the method comprises:

determining edge computing related information concerning edge computing for a session of a user equipment,
including the edge computing related information in route selection policy information, and
providing the route selection policy information to the user equipment based on determining that currently edge computing is applied to the session.

In examples of the first and second aspects, the route selection policy information may be provided to the user equipment based on detection of an edge computing related change.

In examples of the first and second aspects, the network control element may subscribe to another network control element for obtaining information concerning an edge computing related change.

In examples of the first and second aspects, the edge computing related change may be detected by receiving information concerning a user plane management event indicating edge computing.

In examples of the first and second aspects, the route selection policy information may be provided to the user equipment via a network control element performing a policy control function for the user equipment.

In examples of the first and second aspects, the network control element may be performing a policy control function for a user equipment, and it may be subscribed to another network control element, which performs a policy control function for a session involving the user equipment, for user plane management events, and the edge computing related information may be updated and the route selection policy information including the updated edge computing related information may be provided to the user equipment when a user plane management event indicates an edge computing related change.

In examples of the first and second aspects, the edge computing related information may comprise information concerning the usage of edge computing and/or benefits of edge computing.

According to a third aspect, an apparatus of a user equipment is provided, wherein the apparatus comprises: at least one processor and at least one memory including computer program code, the at least one memory and the computer program code configured to, with the at least one processor, cause the apparatus at least to perform: receiving route selection policy information, the route selection policy information comprising edge computing related information concerning edge computing for a session of the user equipment, and deciding on offloading of traffic in connection with the session based on the edge computing related information of the received route selection policy information.

According to a fourth aspect, a method for use in a user equipment is provided, wherein the method comprises:

receiving route selection policy information, the route selection policy information comprising edge computing related information concerning edge computing for a session of the user equipment, and deciding on offloading of traffic in connection with the session based on the edge computing related information of the received route selection policy information.

In examples of the third and fourth aspects, the edge computing related information may comprise information concerning the usage of edge computing and/or benefits of edge computing.

In examples of the third and fourth aspects, the information concerning benefits of edge computing may comprise information about latency reduction achievable by using edge computing for the session.

In examples of the third and fourth aspects, in deciding on offloading of traffic in connection with the session based on the edge computing related information, traffic may be sent to the network in which edge computing is applied, instead that traffic is offloaded to a network in which no edge computing is applied.

In examples of the third and fourth aspects, the network in which no edge computing is applied may be a Wifi network.

In examples of the third and fourth aspects, the route selection policy information may be received when currently edge computing is applied to the session.

According to a fifth aspect, an apparatus of a network control element performing a policy control function for a session is provided, wherein the apparatus comprises: at least one processor and at least one memory including computer program code, the at least one memory and the computer program code configured to, with the at least one processor, cause the apparatus at least to perform: subscribing to a session management function for user plane management events, and providing edge computing related information concerning edge-computing related changes to a network element performing a policy control function for a user equipment involved in the session when the user plane management event indicates an edge computing related change.

According to a sixth aspect, a method for use in a network control element performing a policy control function for a session is provided, wherein the method comprises:

subscribing to a session management function for user plane management events, and providing edge computing related information concerning edge-computing related changes to a network element performing a policy control function for a user equipment involved in the session when the user plane management event indicates an edge computing related change. The session as described in all aspects may be a protocol data unit session.

According to a seventh aspect of the present invention a computer program product is provided which comprises code means for performing a method according to any one of the second, fourth and sixth aspects and/or their modifications when run on a processing means or module. The computer program product may be embodied on a computer-readable medium, and/or the computer program product may be directly loadable into the internal memory of the computer and/or transmittable via a network by means of at least one of upload, download and push procedures.

According to an eighth aspect, an apparatus is provided which comprises:

means for determining edge computing related information concerning edge computing for a session of a user equipment, means for incorporating the edge computing related information in route selection policy information, and means for providing the route selection policy information to the user equipment when it is determined that currently edge computing is applied to the session.

According to a ninth aspect, an apparatus is provided which comprises:

means for receiving route selection policy information, the route selection policy information comprising edge computing related information concerning edge computing for a session of the user equipment, and means for deciding on offloading of traffic in connection with the session based on the edge computing related information of the received route selection policy information.

According to a tenth aspect, an apparatus is provided which comprises:

means for subscribing to a session management function for user plane management events, and providing edge computing related information concerning edge-computing related changes to a network element performing a policy control function for a user equipment involved in the session when the user plane management event indicates an edge computing related change.

BRIEF DESCRIPTION OF THE DRAWINGS

These and other objects, features, details and advantages will become more fully apparent from the following detailed description of example embodiments, which is to be taken in conjunction with the appended drawings, in which.

DETAILED DESCRIPTION OF EXAMPLE EMBODIMENTS

In the following, description will be made to example embodiments. It is to be understood, however, that the description is given by way of example only, and that the described example embodiments are by no means to be understood as limiting the subject matter of the present disclosure thereto.

Before describing example embodiment, in the following, problems of the prior art are discussed in some more detail.

As mentioned above, a UE has no way of knowing when edge computing is being used for certain traffic of a PDU session, and/or what this means for the QoS (e.g., latency) of this traffic of the PDU session.

This is a problem because, depending on local settings, a UE that has traffic for a PDU session for which edge computing is being used, might send this traffic towards a 5GC (i.e., a UPF of the 5GC) via a non-3GPP access node (e.g., a WiFi access node) rather than a 3GPP access node. When a UE sends traffic of a PDU session to a non-3GPP access node is using edge computing is likely to lead to QoS deterioration.

Example embodiments are directed to overcome this problem, and according to some example embodiments, the UE is provided with dynamic indications concerning the use of edge computing for traffic of a session (e.g., PDU session) of the UE via URSP (UE Route Section Policy) rules.

In general, the UE can be provisioned with URSP (UE Route Selection Policy) rules, which the UE uses to select a PDU Session with certain parameters (e.g., with the proper target DNN and S-NSSAI) for certain traffic, potentially depending on the UE location. For example, a URSP rule can instruct the UE to use a PDU Session with data network identified by dnn1, network slice identified by s-nssai1 whenever the UE is sending traffic towards app1.com ("domain descriptor" of the URSP rule) and the UE is located in a certain area ("spatial validity" of the URSP rule). URSP rules are not used only for edge computing, but they can be used to support edge computing.

In the following, a general overview of some example embodiments is described by referring to FIGS. 1A, 1B, 2A, 2B, 3A and 3B.

Figure 1A:
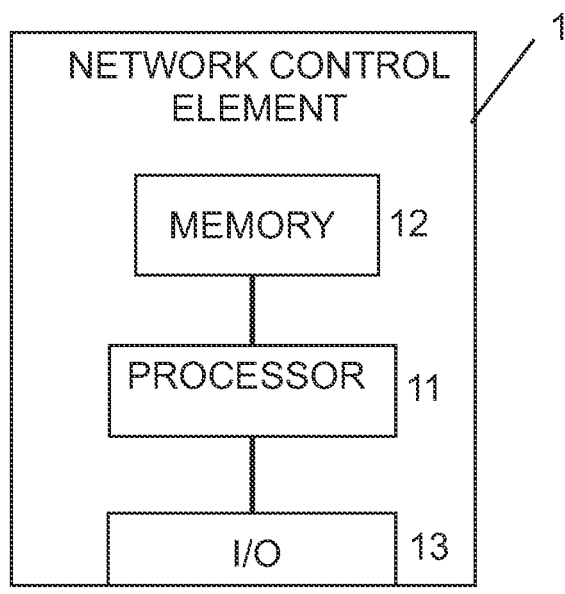
FIG. 1A shows a network control element according to an example embodiment.
Figure 1B:
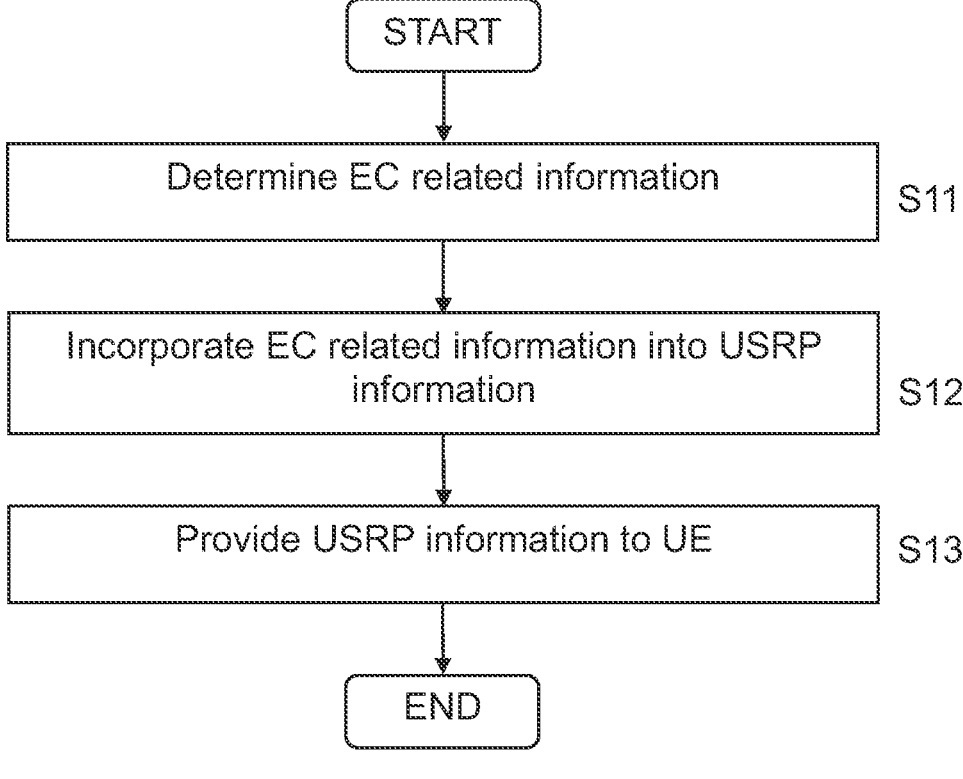
FIG. 1B shows a process carried out by the network control element according to the example embodiment.

FIG. 1A shows a network control element 1 according to the present example embodiment. FIG. 1B shows a procedure carried out by the network control element 1.

The network control element 1 shown in FIG. 1A comprises at least one processor 11 and at least one memory 12 including computer program code. The at least one processor 11, with the at least one memory 11 and the computer program code, is configured to cause the network control element 1 to perform: determining edge computing related information concerning edge computing for a session of a user equipment (S11 in FIG. 1B), incorporating the edge computing related information in route selection policy information (e.g., URSP information) (S12 in FIG. 2B), and providing the route selection policy information to the user equipment when is determined that currently edge computing is being used for traffic of the session (S13 in FIG. 1B).

Figure 2A:
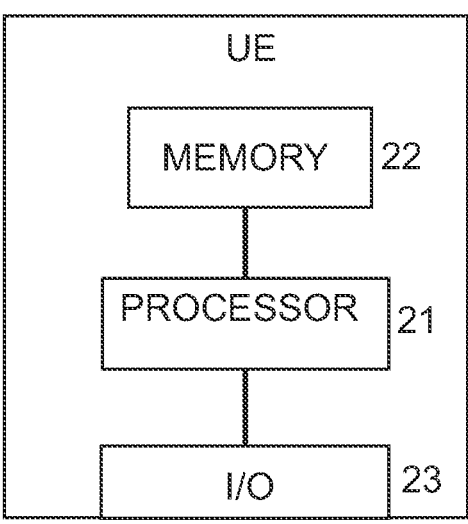
FIG. 2A shows a UE according to an example embodiment.
Figure 2B:
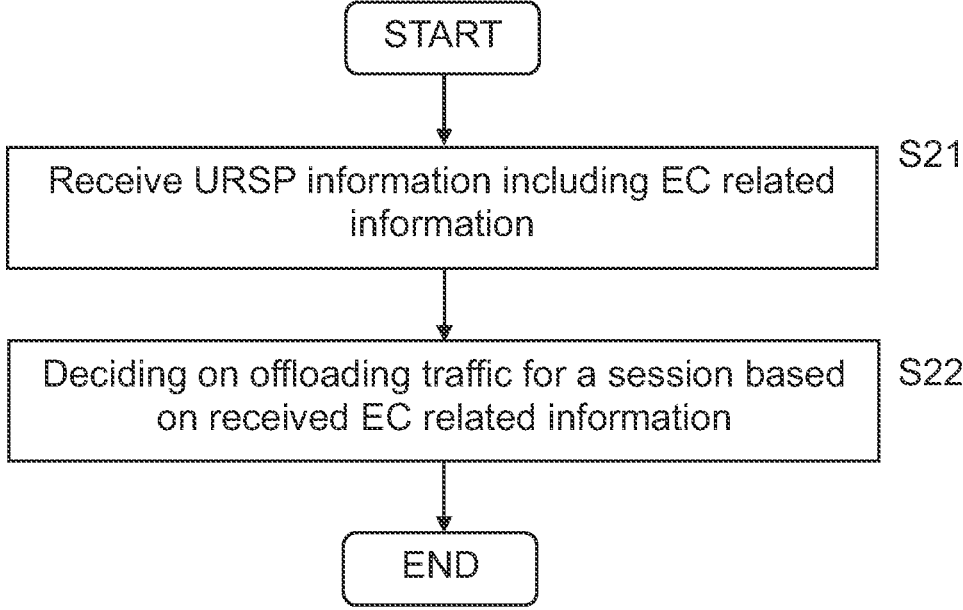
FIG. 2B shows a process carried out by the UE shown in FIG. 2A according to the example embodiment.

FIG. 2A shows a second apparatus according to the present example embodiment as an example. It is noted that the second apparatus may be a user equipment (e.g., UE 2), but also may be only a part of a user equipment (e.g., a chipset of UE 2). A method or process performed by the second apparatus is illustrated in FIG. 2B.

The UE 2 shown in FIG. 2A comprises at least one processor 21 and at least one memory 22 including computer program code. The at least one processor 21, with the at least one memory 22 and the computer program code, is configured to cause the UE 2 to perform: receiving route selection policy information (e.g. URSP information as described above), the route selection policy information comprising edge computing related information concerning use of edge computing for a session of the user equipment (S21 in FIG. 1B), and deciding on directing and/or offloading the traffic of the session to a local data network comprising one or more edge application servers based on the edge computing related information included in the received route selection policy information (S12 in FIG. 1B).

Figure 3A:
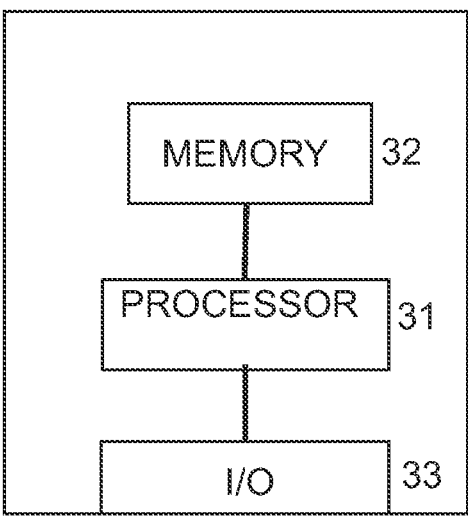
FIG. 3A shows a PCF according to an example embodiment.
Figure 3B:
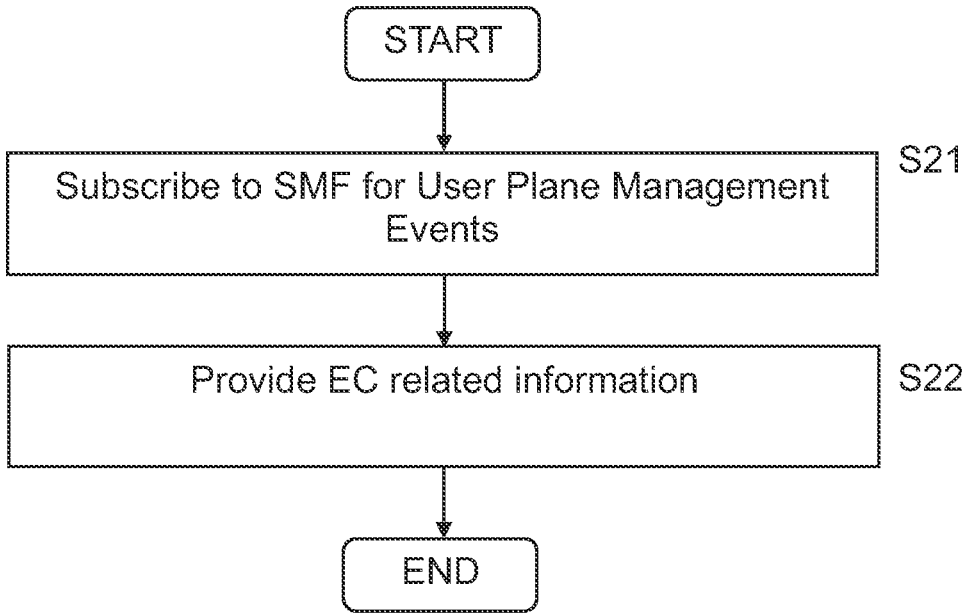
FIG. 3B shows a process carried out by the PCF shown in FIG. 3 according to the example embodiment, FIG. 4, which reproduces FIGS. 4.2-1 of TS 23.548, illustrates a physical entities and logical entities of a 5$^{th}$ generation wireless communication system connected to a data network for providing access to one or more EAS with uplink (UL) classifier/branching point (CL/BP) for a non-roaming scenario (i.e., when a UE is not roaming but rather being served by it home public land mobile network)

FIG. 3A shows a PCF 3 according to an example embodiment. In some embodiments, the PCF 3 may be comprised in or implemented in a third apparatus comprising hardware (e.g., at least one processor, and at least one memory) and software configured to provide the functions or functionality of a PCF, including providing policy rules to a session management function of a core network for enforcement thereof. It is noted that the third apparatus may be a network control element, such as the network control element 1, performing operations of a policy control function (PCF) or only a part thereof. FIG. 3B shows a procedure carried out by the PCF 3.

The PCF apparatus 3 shown in FIG. 3A comprises at least one processor 31 and at least one memory 32 storing computer program code of a PCF or computer code that implements functionality of a PCF. The at least one processor 31, with the at least one memory 31 and the computer program code, is configured to cause the PCF apparatus 3 to perform: subscribing to a session management function for user plane management events (S31 in FIG. 3B), and providing edge computing related information concerning edge-computing related changes to a policy control function for a user equipment involved in the session when the user plane management event indicates an edge computing related change (S32 in FIG. 3B).

The network control element 1 and the UE 2 described above may further comprise I/O units 13, 23, which are capable of transmitting to and receiving control plane signalling and/or data from other network elements.

In some embodiments, a core network may comprise an apparatus which comprises or implements one or more network functions of the core network, including a PCF, for example. The apparatus may be a computing system, such as a standalone computing system, a distributed computing system, or a cloud computing system. The computing system comprises hardware resources (e.g., compute (i.e., one or more processors), storage resources (one or more memories) and network resources), a virtualization layer for providing one or more of the network functions, including the PCF, of the core network. The one or more network functions may be provided by the one or more virtual machines are generally referred to as virtualized network functions.

Thus, according to some example embodiments as described above, a PCF may incorporate or include edge computing related information in route selection policy information such as URSP rules. In this way, the UE can be reliably informed concerning or about the use of edge computing for certain traffic of a session for the UE, so that the UE can base decisions concerning sending traffic in connection with the session based on the route selection policy information.

The edge computing related information may be updated each time there is a change in edge computing conditions, so that the UE can be dynamically informed regarding which edge application servers are currently being used for certain traffic of a session for the UE.

The edge computing related information may comprise information on the usage of edge computing and/or certain benefits of edge computing, such as improved QoS (e.g., reduced latency) or the like.

Examples for the network control element 1 described above comprise an AF and a PCF. For detecting changes in edge computing (or changes related to the use of edge computing), the network control element 1 may be subscribed to another network control element, which is capable of providing (or configured to provide) corresponding information. For example, the PCF may control policy for the UE, and may be subscribed to a PCF for the PDU session.

The PCF 3 (or the third apparatus comprising or implementing the PCF 3) may provide a policy for the session, e.g., may be a PCF for a PDU session. That is, the PCF 3 may be the third apparatus to which the network control element 1 (PCF for UE) is subscribed.

In the following, some further detailed embodiments are described.

As mentioned above, according to some example embodiments, a UE is provided with dynamic indication(s) which indicate that the 5GC (e.g., the UPF) is offloading traffic of a session to a local data network so that the UE's traffic offloading decisions can be enhanced, especially in the edge computing case, via the URSP (UE Route Selection Policy) rule(s).

The above involves:

i) a URSP rule is provided to a UE that includes (dynamic) information about the usage of edge computing by the 5GC and/or the benefits of edge computing.

ii) generating and delivering, by a PCF, updated URSP rules upon detecting edge computing-related events within a PDU Session. It is noted that according to the prior art the URSP rules are not impacted by events related to the PDU sessions of a UE, and therefore some example embodiments include such dynamic information in the URSP.

By providing a UE with a URSP rule that includes dynamic information about the usage and/or the benefits of edge computing, the UE is capable of continuing (or configured) to use a PDU session established to send traffic to EAS at a local data network, even when connectivity to an access network outside of 5GS, such as a non-integrated WiFi network, becomes available.

Table 1 shows an example of an extended Route Selection Descriptor (RSD) of a URSP rule, which is based on the RSD described in TS 23.503 Table 6.6.2.1-3. According to some example embodiments, the RSD includes one or more of the following new information elements:

A new information element having the information name "Non-Seamless Offload counter-indication" which indicates that the traffic of the matching application is not recommended to be offloaded to non-3GPP access outside of a PDU Session (e.g., because an optimization of the delivery of traffic of the PDU session can be performed). In other words, the RDS of a URSP rule includes information which indicates that the traffic of the matching application is not recommended to be directed to and/or offloaded to non-3GPP access outside of a PDU Session.

A new information element having the information name "Route Selection Features" comprises features that apply when this RSD is selected.

A new information element having the information name "EC tag" which indicates that edge computing (i.e., traffic directed to and/or offloaded to an edge application server of a local DN) is being used by the 5GC (i.e., the 5GC is offloading or directing certain traffic of a session (e.g., PDU session) to a local data network (i.e., A new information element having the information name "Latency-reduction-factor" which indicates the factor of latency reduction achieved due to edge computing (applicable only if EC tag is set).

The new information elements described above may not be included in very URSP rule, however the core network and the UE must be capable of processing URSP rules that include that new information elements.

| Information element name | Description | Category |
|---|---|---|
| Route Selection Descriptor Precedence | Determines the order in which the Route Selection Descriptors are to be applied. | Mandatory |
| Route selection components | This part defines the route selection components | Mandatory |
| SSC Mode Selection | One single value of SSC mode. | Optional |
| Network Slice | Either a single value or a list of values of S- | Optional |

-continued

| Information element name | Description | Category |
|---|---|---|
| Selection | NSSAI(s). | |
| DNN Selection | Either a single value or a list of values of DNN(s). | Optional |
| PDU Session Type Selection | One single value of PDU Session Type | Optional |
| Non-Seamless Offload indication | Indicates if the traffic of the matching application is to be offloaded to non-3GPP access outside of a PDU Session. | Optional |
| Non-Seamless Offload counter-indication | Indicates that the traffic of the matching application is not recommended to be offloaded to non-3GPP access outside of a PDU Session (e.g., because an optimization of the traffic can be performed). | Optional |
| ProSe Layer-3 UE-to-Network Relay Offload indication | Indicates if the traffic of the matching application is to be sent via a ProSe Layer-3 UE-to-Network Relay outside of a PDU session. | Optional |
| Access Type preference | Indicates the preferred Access Type (3GPP or non-3GPP or Multi-Access) when the UE establishes a PDU Session for the matching application. | Optional |
| PDU Session Pair ID | An indication shared by redundant PDU Sessions as described in clause 5.33.2.1 of TS 23.501. | Optional |
| RSN | The RSN as described in clause 5.33.2.1 of TS 23.501. | Optional |
| Route Selection Validation Criteria | This part defines the Route Validation Criteria components | Optional |
| Time Window | The time window when the matching traffic is allowed. The RSD is not considered to be valid if the current time is not in the time window. | Optional |
| Location Criteria | The UE location where the matching traffic is allowed. The RSD rule is not considered to be valid if the UE location does not match the location criteria. | Optional |
| Route Selection Features | This part includes features that apply when this Route is selected | Optional |
| EC tag | Edge computing (i.e., traffic directing and/or offloading to a local DN) is being performed. | Optional |
| Latency-reduction-factor | Indicates the factor of latency reduction achieved due to edge computing (applicable only if EC tag is set). | Optional |

Thus, in this way the UE receives information concerning the use of edge computing by the 5GC receiving the route selection policy information.

Since the proposed information element included in the Route Selection Descriptor is (contrary to all existing information elements) provisioned upon events related to a PDU Session, namely upon User Plane Management Events as described in TS 23.502 clause 4.3.6.3 of the 3GPP standard (which indicate if edge computing is performed), the Notification of user plane management event should be extended to potentially lead to an update of UE policies (to include the new URSP rules).

According to some example embodiments, two possible solutions for this are provided, namely:

Solution A: The Nnef_ServiceParameter service operation enables an AF to provide the new indications in its URSP guidance part of the Nnef_ServiceParameter_Create/ Update request, and potentially trigger the invocation of such a request by the AF when the AF is notified about a User Plane Management Event that may indicate edge computing is being used for certain traffic of a session, e.g. DNAI (Data Network Application Identifier) change event. (NOTE that a DNAI change event may indicate to the AF that Edge Computing is being performed or not on traffic of a session, depending on the information that the AF has about this DNAI).

Solution B: A PCF for the PDU Session (i.e. the PCF that is responsible for the PDU Session that is subject to edge computing) is configured to subscribe to the SMF and be notified of User Plane Management Events (e.g. DNAI change or Local PSA UPF selection), and in turn the PCF for a UE (i.e. the PCF that is responsible for provisioning (i.e., providing) the URSP rules to a UE) to subscribe to the PCF for a PDU Session for notification of such User Plane Management Events. When a PCF for a UE is notified about a User Plane Management Event that indicates traffic offload to a local Data Network, may determine and trigger an update of the URSP rules to the UE.

Figure 4:
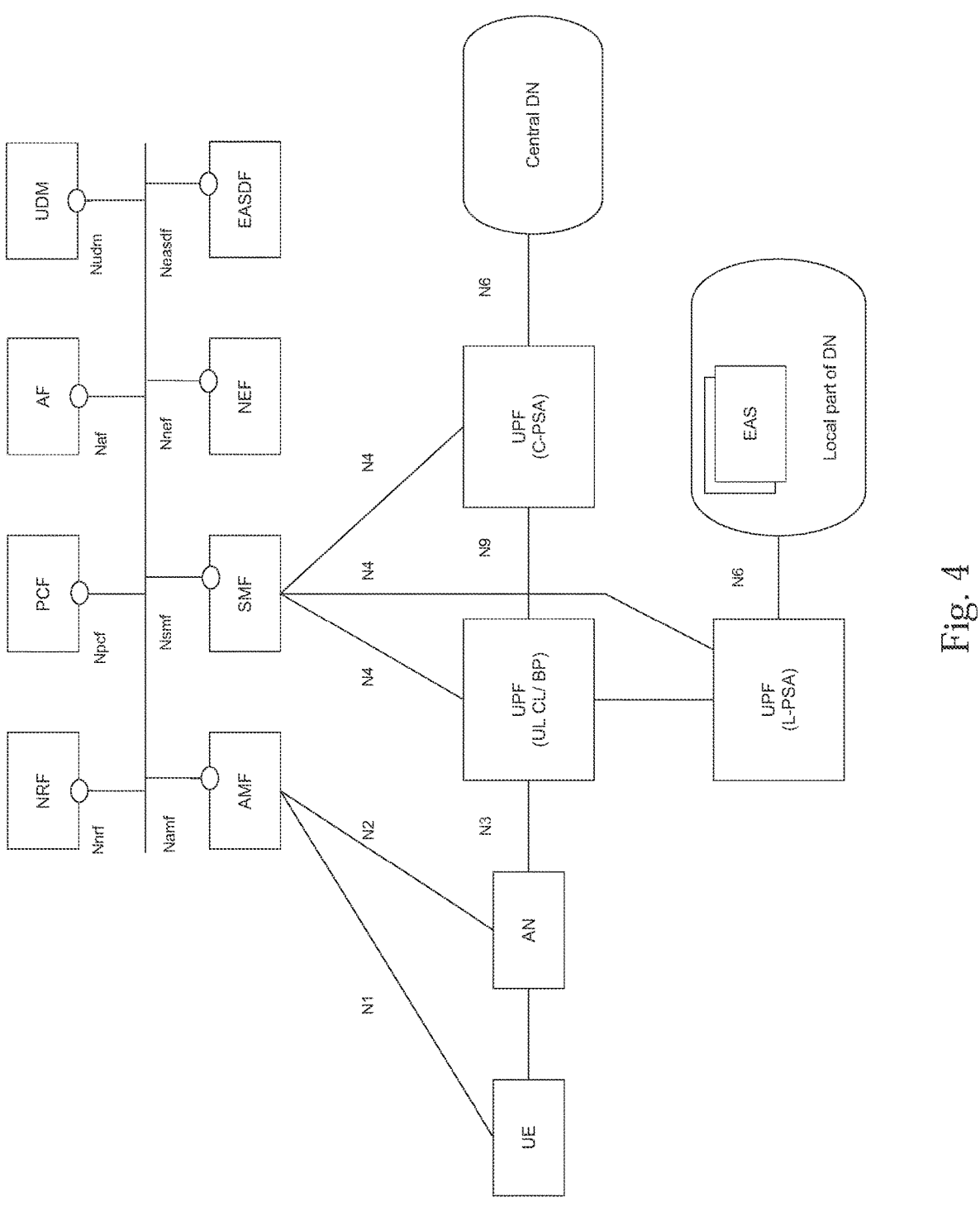
Figure 5:
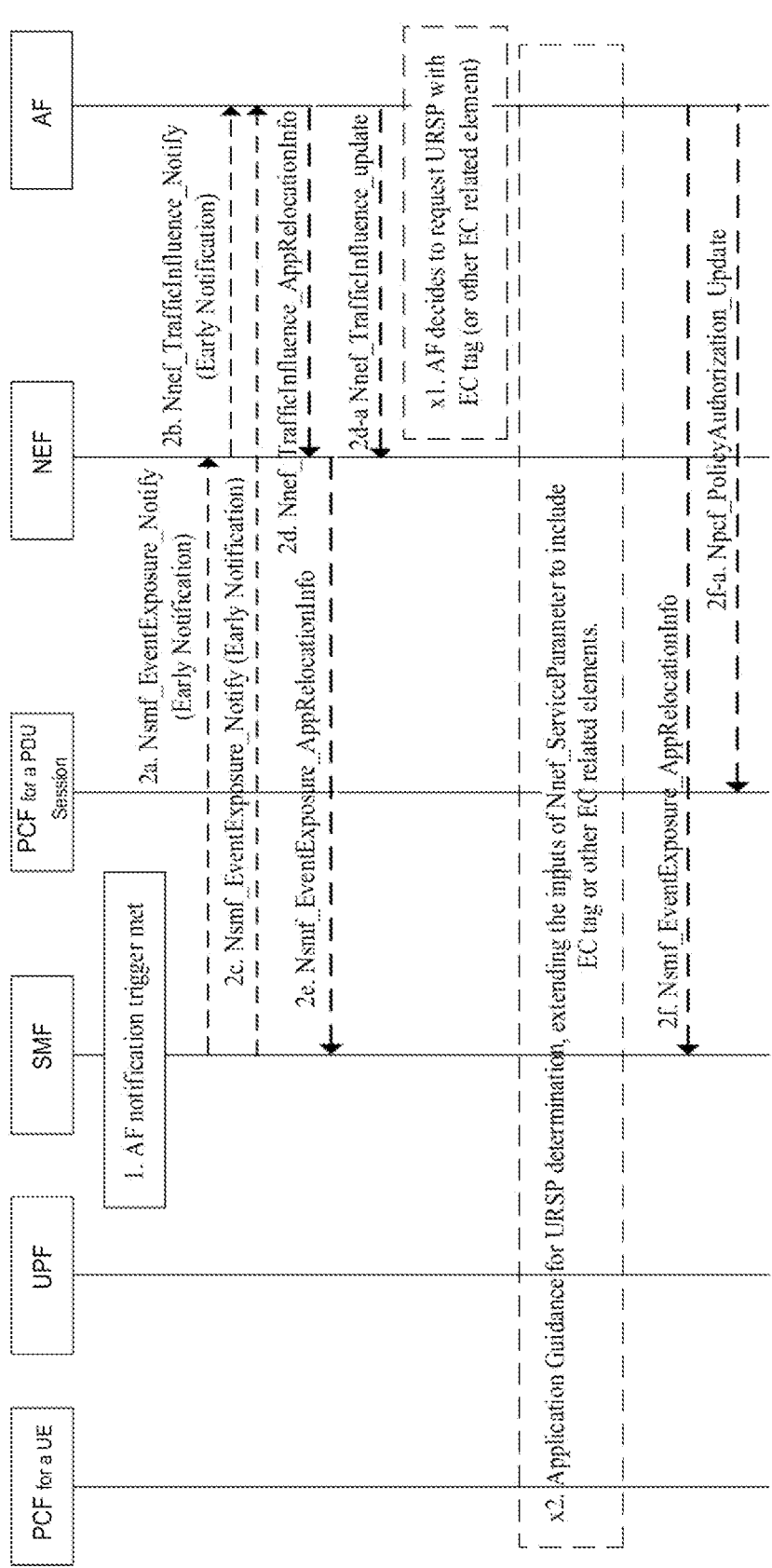
FIG. 5 shows a first solution for providing USRP information including EC related information according to an example embodiment.
Figure 6:
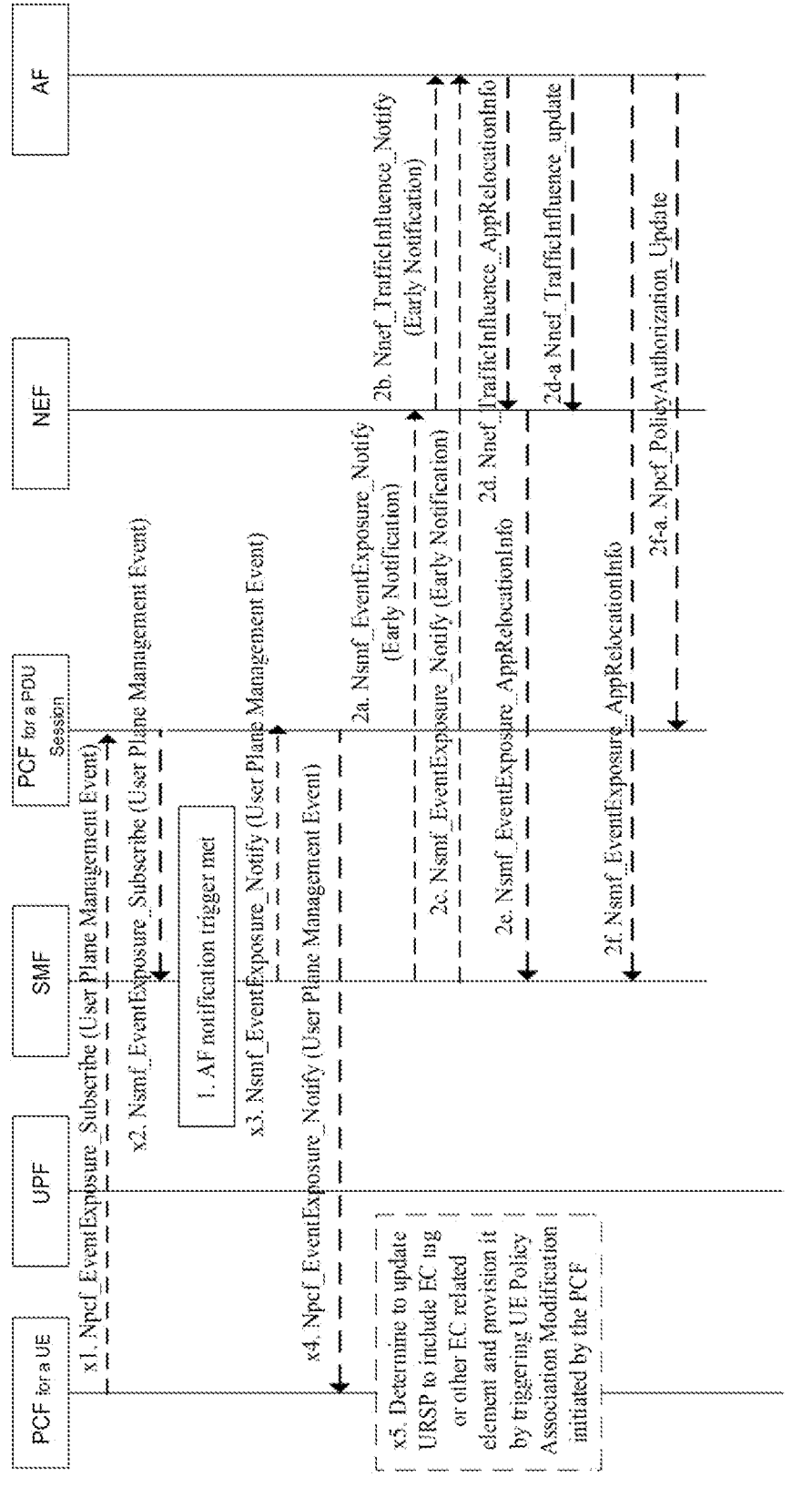
FIG. 6 shows a second solution for providing USRP information including EC related information according to an example embodiment for providing a call flow according to a second embodiment.

FIG. 5 shows a diagram illustrating control plane signaling ("signaling") of the physical and logical entities of FIG. 4 and processes (i.e., operations) performed by the physical and logical entities of FIG. 4 for implementing Solution A, while FIG. 6 shows a diagram illustrating control plane signaling of the physical and logical entities of FIG. 4 and operations performed by the physical and logical entities of FIG. 4 for implementing Solution B.

In more detail, FIG. 5 shows notification of a User Plane Management Event. In process 1, a condition for an AF notification of a User Plane Management Event has been met. The SMF sends a notification of a User Plane Management Event to the NF that is subscribed to the SMF for receiving notifications of User Plane Management Events from the SMF. Further processing of the SMF notification depends on the receiving NF, as shown in at 2a and 2c.

At 2a, if early notification via NEF is requested by the AF, the SMF notifies the NEF of the target DNAI of the target data network and may indicate capability of supporting EAS IP replacement in 5GC by invoking Nsmf_EventExposure_Notify service operation.

At 2b, when the NEF receives Nsmf_EventExposure_Notify message, the NEF performs information mapping (e.g., AF Transaction Internal ID provided in Notification Correlation ID to AF Transaction ID, SUPI to GPSI, etc.) as applicable according to clause 5.6.7 of TS 23.501 and triggers the appropriate Nnef_TrafficInfluence_Notify message. In this case, action 2c is not applicable.

At 2c, if early direct notification is requested by the AF, the SMF notifies the AF of the target DNAI of the PDU Session and may indicate capability of supporting EAS IP replacement in 5GC by invoking Nsmf_EventExposure_Notify service operation.

At 2d, the AF replies to Nnef_TrafficInfluence_Notify by invoking Nnef_TrafficInfluence_AppRelocationInfo service operation either immediately or after any required application relocation in the target DNAI is completed. The AF may include N6 traffic routing details corresponding to the target DNAI and/or the 'uplink buffering' indication to indicate that buffering of uplink traffic to the target DNAI is needed. The AF may include Information for EAS IP Replacement in 5GC. AF may reply in negative e.g., if the AF determines that the application relocation cannot be completed successfully and/or on time.

At 2d-a, if information sent via Nnef_TrafficInfluence_Create is to be changed N6 traffic routing details corresponding to the target DNAI, the AF invokes Nnef_TrafficInfluence_update service operation in order for PCF to be able to include this information in PCC rules sent to SMF.

At 2e, when the NEF receives Nnef_TrafficInfluence_AppRelocationInfo, the NEF triggers the appropriate Nsmf_EventExposure_AppRelocationInfo message.

Thereafter, when the NEF receives Nnef_TrafficInfluence_update, the NEF triggers at 3a as in FIG. 4.3.6.2-1 or at 2 of FIG. 4.3.6.4-1 of 23.502 if targeting an individual UE by a UE address.

X1 denotes a new process according to some example embodiments. In particular, at x1, the AF decides to request URSP with or comprising an EC tag (or another EC related element).

At x2, AF guidance on URSP determination (e.g., as described in TS 23.502, clause 4.15.6) is provided, but the inputs of Nnef_ServiceParameters are extended to include EC tag or other EC related elements.

At 2f, the AF replies to Nsmf_EventExposure_Notify message by invoking Nsmf_EventExposure_AppRelocationInfo service operation either immediately or after any required application relocation in the target DNAI is completed. The AF may include N6 traffic routing details corresponding to the target DNAI and/or the 'uplink buffering' indication to indicate that buffering of uplink traffic to the target DNAI is needed. The AF may include Information for EAS IP Replacement in 5GC. AF may reject the DNAI change and reply to Nsmf_EventExposure_Notify message by sending a message if the AF determines that the application relocation cannot be completed successfully on time.

In 2f-a, if information sent via Npcf_PolicyAuthorization_Create is to be changed e.g., N6 traffic routing details corresponding to the target DNAI, the AF invokes Npcf_PolicyAuthorization_Update service operation in order for PCF to be able to include this information in PCC rules sent to SMF.

In the following, FIG. 6 is described by concentrating on the differences to FIG. 5.

At x1, the PCF for UE subscribes to the PCF for PDU session for notifications of User Plane Management Events, such as a DNAI change, by sending a Npcf_EventExposure_Subscribe (User Plane Management Event) message to the PCF for PDU session.

In turn, at X2, the PCF for a PDU session subscribes to the SMF for notifications of User Plane Management Events by sending a Nsmf_EventExposure_Subscribe (User Plane Management Event) message to the SMF.

At 1, it is assumed that an AF notification trigger is met.

Thus, at x3, the SMF notifies the PCF for PDU session that the AF notification trigger is met by sending an Nsmf_EventExposure_Notify (User Plane Management Event) message (i.e., a Nsmf_EventExposure_Notify message that includes the User Plane Management Event).

In turn, at x4 the PCF for PDU session notifies the PCF for the UE that the AF notification trigger is met by sending a Nsmf_EventExposure_Notify (User Plane Management Event) message.

After receiving Nsmf_EventExposure_Notify message, in X5, the PCF for UE determines to update URSP to include EC tag or another EC related element and provisions the UE with the updated URSP (i.e., provides the updated URSP to the UE)_by triggering UE Policy Association Modification initiated by the PCF as described in TS 23.502 clause 4.16.12.2.

The remaining control plane signaling 2a-2f-a shown in FIG. 6 is the same as the control plane signaling 2a-2f-a shown in FIG. 5.

In both solutions, the User Plane Management Events that can be subscribed for are the User Plane Management Events specified in 3GPP TS 23.502 and new events that indicate that the SMF has established a local PDU session or an Edge Computing PDU session (via selection of the PSA UPF and/or UL CL UPF for offloading local traffic) for any of the Edge Computing connectivity models described in TS 23.548 v17.2.0 clause 4.3 (i.e. Distributed Anchor Point, Session Breakout, Multiple PDU Sessions). This can be achieved either with a generic new event such as "Local PSA UPF and/or UL CL UPF used" or with more fine-granular events, e.g. indicating also the used connectivity model and/or simply indicating Edge specific PDU session and/or information related to latency benefits compared to using the central PSA UPF (which can in turn be used by the PCF for a UE to potentially set the "EC Tag" and/or "Latency-reduction-factor" attribute in the URSP rule).

When taking the decision to trigger the sending of the EC tag to the PCF e.g., at x3 in FIG. 6, the SMF for a UE may take into account if the Edge DNS Client (EDC) functionality is available for this UE or not.

Additionally, when taking the decision to trigger the sending of this indication to the UE, the SMF and/or the PCF for a UE may take into account if the Edge DNS Client (EDC) functionality is available for this UE or not.

Thus, according to some example embodiments, it is possible to reliably inform a UE that edge computing can be used for certain traffic of a session, and to inform the UE about possible benefits for the QoS of the session (e.g., concerning latency).

Moreover, according to some example embodiments, the edge computing related information (such as EC tag or other EC related elements) is provided dynamically. That is, the extended URSP information including the edge computer related information is only set when traffic offloading to the local network is actually taking place (i.e., when Edge Computing is actually being performed). Further, according to example embodiments, the option is possible that quantified benefits of the usage of Edge Computing are provided, so that the UE can take a more educated decision about steering the traffic outside of the 3gpp system or not.

Names of network elements, protocols, and methods described herein are based on current 3GPP standards. In other versions or other technologies, the names of these network elements and/or protocols and/or methods may be different, as long as they provide a corresponding functionality.

In general, the example embodiments may be implemented by computer software stored in the memory (memory resources, memory circuitry) 12, 22 and executable by the processor (processing resources, processing circuitry) 11, 21 or by hardware, or by a combination of software and/or firmware and hardware.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The memory (memory resources, memory circuitry) 12, 22, 32 may be of any type suitable to the local technical environment and may be implemented using any suitable data storage technology, such as semiconductor based memory devices, magnetic memory devices and systems, optical memory devices and systems, fixed memory and removable memory, and non-transitory computer-readable media. The processor (processing resources, processing circuitry) 11, 21 may be of any type suitable to the local technical environment, and may include one or more of general purpose computers, special purpose computers, microprocessors, digital signal processors (DSPs) and processors based on a multi core processor architecture, as non-limiting examples.

It is to be understood that the above description is illustrative of the invention and is not to be construed as limiting the invention. Various modifications and applications may occur to those skilled in the art without departing from the true spirit and scope of the invention as defined by the appended claims.

We claim:

1. An apparatus for a core network of a communication system, the apparatus comprising:

at least one processor; and at least one memory comprising instructions of a policy control function of the core network, wherein the instructions, when executed by the at least one processor, cause the apparatus at least to perform operations, wherein the policy control function is for a user equipment, and wherein the operations comprise:

determining edge computing related information concerning edge computing for traffic of a protocol data unit (PDU) session of the user equipment, including the edge computing related information in route selection policy information;

providing the route selection policy information to the user equipment based on a determination that edge computing is being used for the traffic of the PDU session of the user equipment;

providing the route selection policy information to the user equipment based on detecting a change to the edge computing being used for the traffic of the PDU session of the user equipment; and subscribing to a second policy control function of the core network for being notified of changes to the edge computing being used for the traffic of the PDU session of the user equipment, wherein the second policy control function is for the PDU session of the user equipment.

2. The apparatus according to claim 1, wherein the detecting the change to edge computing being used for the traffic of the PDU session of the user equipment comprises receiving information concerning a user plane management event indicating the change to the edge computing being used for the traffic of the PDU session of the user equipment.

3. The apparatus according to claim 1, wherein the edge computing related information comprises at least one of: information concerning usage of edge computing; or information concerning benefits of edge computing.

4. An apparatus for a core network of a communication system, the apparatus comprising:

at least one processor; and at least one memory comprising instructions of a policy control function of the core network, wherein the instructions, when executed by the at least one processor, cause the apparatus at least to perform operations, wherein the policy control function is for a user equipment, and wherein the operations comprise:

determining edge computing related information concerning edge computing for traffic of a protocol data unit (PDU) session of the user equipment, including the edge computing related information in route selection policy information; and providing the route selection policy information to the user equipment based on a determination that edge computing is being used for the traffic of the PDU session of the user equipment;

providing the route selection policy information to the user equipment based on detecting a change to the edge computing being used for the traffic of the PDU session of the user equipment;

subscribing to a second policy control function of the core network for notifications of user plane management events, wherein the second policy control function is for the PDU session of the user equipment; and updating the edge computing related information and providing, to the user equipment, updated route selection policy information comprising the updated edge computing related information after receiving, from the second policy control function, a notification of a user plane management event indicating a change to the edge computing being used for the traffic of PDU session of the user equipment.

5. A method, comprising:

determining, by a policy control function of a core network of a communication system, edge computing related information concerning edge computing for traffic of a protocol data unit (PDU) session of a user equipment, wherein the policy control function is for the user equipment;

including, by the policy control function, the edge computing related information in route selection policy information, providing, by the policy control function to the user equipment, the route selection policy information based on a determination that edge computing is being used for the traffic of the PDU session of the user equipment;

providing, by the policy control function to the user equipment, the route selection policy information based on detecting a change to the edge computing being used for the traffic of the PDU session of the user equipment; and subscribing, by the policy control function to a second policy control function of the core network, for notifications of changes to the edge computing being used for the traffic of the PDU session of the user equipment, wherein the second policy control function is for the PDU session of the user equipment.

6. The method according to claim 5, wherein the detecting the detection of the change to the edge computing being used for the traffic of the PDU session of the user equipment comprises receiving information concerning a user plane management event indicating the change to edge computing being used for the traffic of the PDU session of the user equipment.

7. The method according to claim 6, further comprising:

subscribing by the policy control function to the second policy control function for notifications of user plane management events;

updating the edge computing related information and providing, by the policy control function to the user equipment, updated route selection policy information comprising the updated edge computing related information to the user equipment after receiving, by the policy control function from the second policy control function, a notification of a user plane management event indicating a change to the edge computing being used for the traffic of PDU session of the user equipment.

*     *     *     *     *